US012276813B2

(12) United States Patent
Spring et al.

(10) Patent No.: US 12,276,813 B2
(45) Date of Patent: Apr. 15, 2025

(54) METHOD OF MANUFACTURING A PLURALITY OF OPTICAL ELEMENTS AND PRODUCT THEREOF

(71) Applicant: HEPTAGON PHOTONICS PTE. LTD., Singapore (SG)

(72) Inventors: Nicola Spring, Ruschlikon (CH); QiChuan Yu, Singapore (SG)

(73) Assignee: HEPTAGON PHOTONICS PTE. LTD., Singapore (SG)

( * ) Notice: Subject to any disclaimer, the term of this patent is extended or adjusted under 35 U.S.C. 154(b) by 508 days.

(21) Appl. No.: 17/431,241

(22) PCT Filed: Mar. 11, 2020

(86) PCT No.: PCT/SG2020/050126
§ 371 (c)(1),
(2) Date: Aug. 16, 2021

(87) PCT Pub. No.: WO2020/185162
PCT Pub. Date: Sep. 17, 2020

(65) Prior Publication Data
US 2022/0137269 A1    May 5, 2022

Related U.S. Application Data

(60) Provisional application No. 62/816,977, filed on Mar. 12, 2019.

(51) Int. Cl.
*G02B 3/00* (2006.01)
*B29D 11/00* (2006.01)
(Continued)

(52) U.S. Cl.
CPC ...... *G02B 3/0075* (2013.01); *B29D 11/00307* (2013.01); *G02B 7/025* (2013.01); *G02B 13/0085* (2013.01)

(58) Field of Classification Search
CPC .. G02B 3/0075; G02B 7/025; G02B 13/0085; B29D 11/00307
See application file for complete search history.

(56) References Cited

U.S. PATENT DOCUMENTS

2009/0159200 A1    6/2009    Rossi et al.
2010/0079635 A1    4/2010    Yano et al.
(Continued)

FOREIGN PATENT DOCUMENTS

CN    101685188 A    3/2010
CN    104854483 A    8/2015
(Continued)

OTHER PUBLICATIONS

Translation of WO 2014092148 A1, Jun. 19, 2014, Hayashida, Takaichi (Year: 2014).*
(Continued)

*Primary Examiner* — George R Koch
(74) *Attorney, Agent, or Firm* — Viering, Jantschura & Partner mBB

(57) ABSTRACT

A method of manufacturing a plurality of optical elements (140), the method comprising providing a first wafer (120) having hardened replication material forming optical elements (140) on a first side of the first wafer (120), providing a second wafer (121) having hardened replication material forming optical elements (140) on a first side of the second wafer (121), depositing liquid droplets (180) on the first side of the first wafer (120) between the optical elements (140) aligning the first side of the first wafer (120) with the first side of the second wafer (121), and bringing the two wafers (120, 121) together such that the liquid droplets (180) on the first side of the first wafer (120) adhere to the first side of the second wafer (121).

17 Claims, 3 Drawing Sheets

(51) Int. Cl.
    *G02B 7/02*           (2021.01)
    *G02B 13/00*        (2006.01)

(56) References Cited

U.S. PATENT DOCUMENTS

| | | |
|---|---|---|
| 2015/0168666 A1 | 6/2015 | Brouwer et al. |
| 2016/0247976 A1* | 8/2016 | Rudmann ............ H01L 33/483 |
| 2019/0090720 A1 | 3/2019 | Maeda |

FOREIGN PATENT DOCUMENTS

| | | | |
|---|---|---|---|
| JP | 2001166125 A | 6/2001 | |
| JP | 2006326987 A | 12/2006 | |
| JP | 2014160096 A | 9/2014 | |
| TW | 201022751 A | 6/2010 | |
| WO | WO-2005083789 A2 * | 9/2005 | ............ H01L 24/97 |
| WO | 2014092148 A1 | 6/2014 | |
| WO | 2017212520 A1 | 12/2017 | |

OTHER PUBLICATIONS

International Search Report and Written Opinion for Application No. PCT/US2020/050126 dated Mar. 11, 2020 (13 pages).
Office Action issued from the Chinese Patent Office for related Application No. 202080020318.X dated Oct. 9, 2022 (15 Pages including English Translation).

* cited by examiner

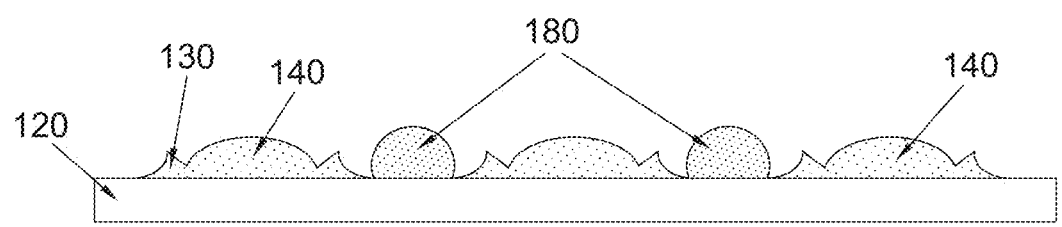
FIG. 3A
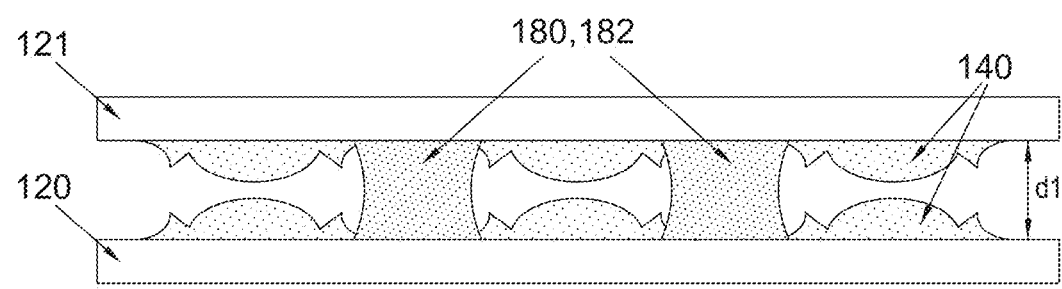
FIG. 3B
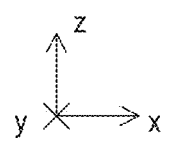

METHOD OF MANUFACTURING A PLURALITY OF OPTICAL ELEMENTS AND PRODUCT THEREOF

TECHNICAL FIELD

This disclosure relates to liquid spacer alignment features.

BACKGROUND

Optical devices that include one or more optical radiation emitters and one or more optical sensors can be used in a wide range of applications including, for example, distance measurement, proximity sensing, gesture sensing, and imaging. Small optoelectronic modules such as imaging devices and light projectors employ optical assemblies that include lenses or other optical elements stacked along the device's optical axis to achieve desired optical performance. Replicated optical elements include transparent diffractive and/or refractive optical elements for influencing an optical beam. In some applications, such optoelectronic modules can be included in the housings of various consumer electronics, such as mobile computing devices, smart phones, or other devices.

SUMMARY

The present disclosure describes optical and optoelectronic assemblies that include micro-spacers, as well as methods for manufacturing such assemblies.

The substrate may be a "wafer", or other base element, with an additional structure added to it, for example with a hardened replication material structure adhering to it, defining a surface of the plurality of optical elements, with some lithographically added or removed features (such as apertures, etc.) or with some other structure. The substrate may comprise any material or material combination.

The optical elements may be any elements influencing light that is irradiating them including but not restricted to lenses/collimators, pattern generators, deflectors, mirrors, beam splitters, elements for decomposing the radiation into its spectral composition, etc., and combinations thereof. Both a replicated structure on one side of a substrate, and an ensemble of two aligned replicated optical elements on two sides of a substrate are called an "optical element".

The tool (or "replication tool") may comprise a first, hard material forming a rigid back plate and a second, softer material portion (replication portion) that forms both the contact spacer portion(s) and the replication sections. Generally, the contact spacer portion(s) may be of the same material as the portion of the tool that forms the replication sections, and may merely be structural features of the tool (not added elements). As an alternative, the contact spacer portions may comprise an additional material, for example a coating of a soft and/or adhesive material on an outermost surface.

As an alternative to a low stiffness material like PDMS, the contact spacers may also comprise an adhesive, for example an adhesive layer. Using a low stiffness material for the entire replication portion of the tool is advantageous regarding its manufacturing, as no separate step for adding the contact spacers or a coating thereof is required. The entire replication portion may be manufactured in a single shape by replicating (molding, embossing etc.) from a master or sub-master that also includes the contact spacer portion(s).

The contact spacer portions are operable to rest against the substrate during replication, with no material between the contact spacer portions and the substrate. The contact spacer portions may be contiguous or may comprise a plurality of discrete portions around the periphery or distributed over a large portion of the periphery and/or an interior of the replication surface. In other words, the contact spacer portion(s) may be in any configuration that allows the replication tool to rest against the substrate. For example, the distribution of the contact spacer portion(s) is such that contact spacer portion(s) are on both sides of every in-plane line through the center of mass of the tool. The spacers are arranged and configured such that if the tool lies on the substrate, the thickness (the z-dimension perpendicular to the substrate and tool plane) is defined by the spacer portions.

In some embodiments, a method of manufacturing a plurality of optical elements, the method includes providing a first wafer having hardened replication material forming optical elements on a first side of the first wafer, providing a second wafer having hardened replication material forming optical elements on a first side of the second wafer, depositing liquid droplets on the first side of the first wafer between the optical elements, aligning the first side of the first wafer with the first side of the second wafer, and bringing the two wafers together such that the liquid droplets on the first side of the first wafer adhere to the first side of the second wafer.

In some instances the liquid droplets are formed of a high viscosity material that can be hardened. The method includes hardening the liquid droplets. Hardening the liquid droplets comprises curing the liquid droplets with UV radiation. The method includes depositing liquid droplets on the first side of the second wafer between the optical elements. The liquid droplets are formed of a high viscosity material that can be hardened. The method includes hardening the liquid droplets, wherein hardening the liquid droplets comprises curing the liquid droplets with UV radiation. Depositing the liquid droplets comprises modulating the volume of each liquid droplet to generate a desired separation distance between the first wafer and the second wafer.

In some embodiments, an apparatus includes a first wafer having hardened replication material forming optical elements on a first side of the first wafer, a second wafer having hardened replication material forming optical elements on a first side of the second wafer, and spacers joining the first wafer and the second wafer, wherein the spacers are shaped as a meniscus.

In some instances the spacers are formed by a process including depositing liquid droplets on the first side of the first wafer between the optical elements, aligning the first side of the first wafer with the first side of the second wafer, and bringing the two wafers together such that the liquid droplets on the first side of the first wafer adhere to the first side of the second wafer. The liquid droplets are formed of a hardened high viscosity material that can be hardened. The liquid droplets are hardened by curing the liquid droplets with UV radiation. Liquid droplets can be deposited on the first side of the second wafer between the optical elements. The liquid droplets are formed of a high viscosity material that can be hardened. The liquid droplets are hardened by curing the liquid droplets with UV radiation. Depositing the liquid droplets comprises modulating the volume of each liquid droplet to generate a desired separation distance between the first wafer and the second wafer.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIGS. 3A-3B show liquid spacer alignment features.

DETAILED DESCRIPTION

Figure 1:
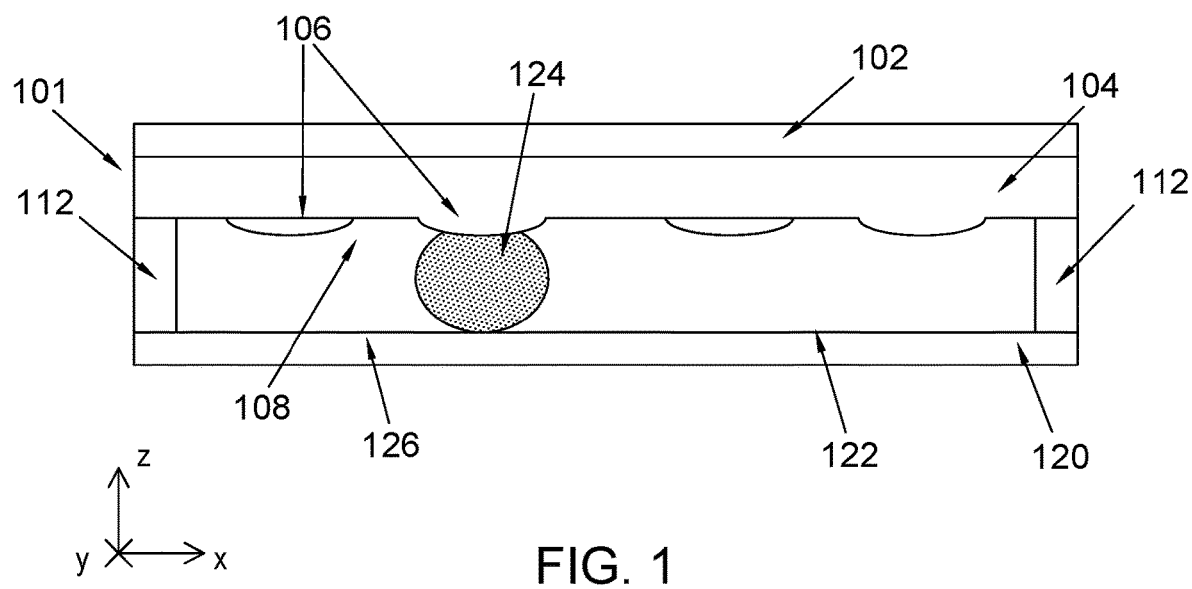
FIG. 1 illustrates an example cross sectional tool/substrate structure for replication.

FIG. 1 schematically shows a cross section through a tool 101 and a substrate 120. The tool 101 in the shown embodiment comprises a rigid backplate 102 of a first material, for example glass, and a replication portion 104 of a second, softer material, for example PDMS. The replication portion forms a replication surface 108 comprising a plurality of replication sections 106, the surface of each of which is a (negative) copy of a surface shape an optical element to be manufactured. The replication sections 106 can be convex and thus define a concave optical element surface, or be convex and define a concave optical element surface.

The replication portion 104 has contact spacer portions 112 that are illustrated as arranged peripherally. The contact spacer portions 112 are the structures of the replication tool 101 that protrude the furthest into the z direction. The contact spacer portions are essentially flat and, thus, are operable to rest against the substrate 120 during replication, with no material between the contact spacer portions 112 and the substrate 120. The contact spacer portions 112 may, for example, form a ring around the periphery of the replication surface 108, may comprise a plurality of discrete portions around the periphery, or may comprise a plurality of discrete portions distributed over a large portion of the periphery and/or an interior of the replication surface 108.

The substrate 120 has a first side (e.g., substrate surface 126) and a second side and can be any suitable material, for example glass. The substrate 120 further has a structure added to it to which the replica is to be aligned. The structure may, for example, comprise a coating 122 structured in the x-y-plane, such as a screen with apertures, or a structured IR filter etc. The structure may in addition, or as an alternative, comprise further features like markings, etc. Further, or as another alternative, the structure may comprise a hardened replication material structure constituting a surface of the optical elements.

For replicating the replication surface 108 of the tool 101, replication material 124 is applied to the substrate 120 or the tool 101 or both the tool 101 and the substrate 120. Such application of replication material 124 may include application of a plurality of portions of replication material 124, one portion for each of the replication sections, to the tool 101 and/or the substrate 120 (although a single portion of replication material 124 is illustrated in the figure). Each portion may, for example, be applied by squirting or jetting one droplet or a plurality of droplets, by a dispensing tool that may for example work in an inkjet-printer-like manner. Each portion may optionally consist of a plurality of subportions that come into contact with each other only during replication. Generally, the droplets are of epoxy.

After application of the replication material 124, the substrate 120 and the tool 101 are aligned with respect to each other. To this end, a process similar to the one used in so-called mask aligners may be used. The alignment process may include aligning at least one particular feature (preferably two features are used) of the tool 101 and/or of the substrate 120 with at least one particular feature of the substrate 120 or the tool 101, respectively, or with a reference point of an alignment device. Suitable features for this include well-defined elements of the structure itself (such as a defined corner of a structured coating or a lens peak etc.), specifically added alignment marks, or possibly also edges etc. of the base element etc. Alignment also includes, as is known in the art, precisely making parallel the tool and substrate surfaces to avoid wedge errors; such parallelization may take place prior to the x-y-alignment.

Subsequent to the alignment, the substrate 120 and the tool 101 are brought together, with the contact spacer portions 112 resting against the substrate surface and defining (if present, together with the floating spacers) the z dimension and also locking the tool against x-y-movements. Thereafter, the substrate-tool-assembly is removed from the alignment station and transferred to a hardening station.

The replication portion 104 of the tool, or at least a surface of the contact spacer portions 112, is made of a material with a comparably low stiffness so that it can, under "normal" conditions where for example no more pressure than the one caused by gravity forces of the tool lying on the substrate or vice versa, adapt to roughnesses on a micrometer and/or sub-micrometer scale and, thus, may form an intimate connection to the substrate surface. In addition, the replication portion of the tool or at least the surface of the contact spacer portion may have a comparably low surface energy to make such adaptation to roughnesses on a micrometer and/or sub-micrometer scale favorable. A preferred example of such a material is polydimethylsiloxane PDMS.

The prior replication steps include hardening the replication material 124 after the replication tool 101 and the base element have been moved towards each other with the replication material 124 between them, and subsequently removing the replication tool 101.

Figure 2:
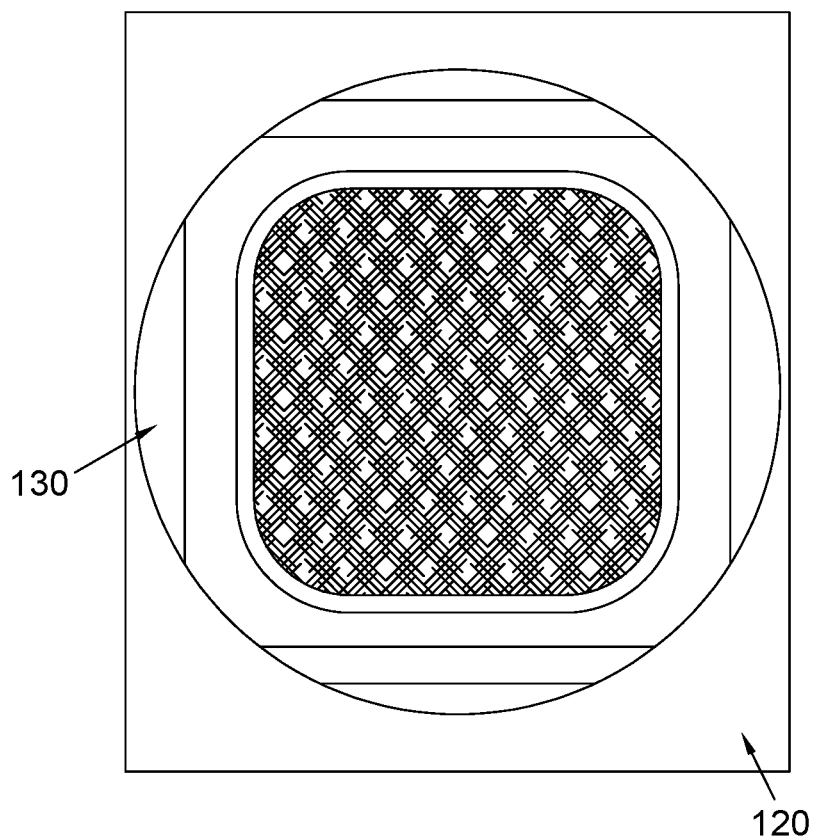
FIG. 2 shows a replicated optical feature with a yard.

Referring to FIG. 2, during replication, excess replication material or epoxy applied during jetting normally overflows the region of interest and forms a yard 130 when the tool and the substrate 120 (e.g., glass) are brought into contact. The yard 130 is typically a circle shape, as shown. This circular yard 130 results from more epoxy 124 being added during the replication process than each structure requires, causing an overflow. The additional epoxy 124 ensures that the complete volume of replication material needed for a particular structure is available (as the tolerance of the epoxy volume is not zero), and the extra fluid pools to form the yard 130.

To control epoxy flow during replication, yard line features (also called "yard lines," "line features," or "yard line features") can be included in the tool 101 design to control the fluid flow of the replication material 124 while it is liquid. Such features can be included in the mastering process itself (during laser writing) or can be added afterwards in a lithomold process where the features can be structured into an additional layer of epoxy. The yard line features described herein can be integrated in all kind of masters fabricated by different technologies (EBL, laser writer, etc.).

In some instances, a stack of optical elements is created using multiple substrates 120. For example, one or both of the optical elements or substrates can be a dielectric filter or interference filter designed to operate in contact with a particular refractive index (e.g., air or vacuum, a polymer-based filter (e.g., an IR absorber), diffusers (e.g., diffuser foils), etc. A stack of optical elements includes a first optical element and a second optical element separated from one another by a small air or vacuum gap. In assembly, first and second element spacers are deposited, respectively, on either side of the second optical element. Each of the element spacers can have, for example, an annular shape or a closed rectangular loop shape that laterally surrounds the air or vacuum gap. Thus, the first element spacer separates the first and second optical elements from one another and establishes a small fixed distance between them. The second element spacer projects from the opposite side of the second optical element and can be used to establish another small air or vacuum gap between the second optical element and a device over which the subassembly is mounted.

X, Y, and Z accuracy are important in forming replicated structures including when there are spacers between two layers. For example, high accuracy such as ±5 um may be required, which is expensive and difficult to implement.

Conventional spacers, such as contact spacer portions 112 shown in FIG. 1, require additional clearance from features present on the substrate to account for alignment tolerances. Conventional spacers disadvantageously have a less accurate substrate-to-substrate distance due to additional bond line tolerances. This lowered accuracy has a negative impact on the performance and the overall dimensions of the replicated structures. Additionally, conventional solid spacers can interfere with yard structures FIGS. 3A and 3B show the use of a liquid spacer 180 that can be applied directly to the substrate 120 in a liquid state. The liquid spacer 180 is made of a material with a high viscosity. Referring to FIG. 3A, a network of a high viscosity liquid spacer 180 material is dispensed on the substrate 120 at locations between the hardened replication features 140 present on the substrate 120. The hardened replication features 140 can include associated yards 130. The liquid spacer 180 material can be dispensed continuously or discontinuously. For example, the liquid spacer 180 material can be dispensed as a grid of intersecting lines that are straight or curved, or can be dispensed as a series of disconnected dots or lines.

A second substrate 121 (or fixture) having hardened replication features 140 is then positioned with respect to the first substrate 120. Liquid spacer 180 can also be dispensed on the second substrate 121, continuously or discontinuously. The liquid spacer 180 can be dispensed on the second substrate 121 to mirror the liquid spacer 180 dispensed on the first substrate 120, e.g., dispensed such that the liquid spacer 180 on the first substrate 120 comes into contact with the liquid spacer 180 on the second substrate when the two are brought into proximity. Alternatively, the liquid spacer 180 on the second substrate 121 can be dispensed so that it contacts areas of the first substrate 120 that does not have liquid spacer 180 deposited thereon.

The first substrate 120 and the second substrate 120 are brought into proximity with each other. Once the first substrate 120 and second substrate 121 are in close enough proximity to each other, the liquid spacer 180 forms a meniscus 182 as shown in FIG. 3B. This meniscus 182 can be from liquid material deposited on the first substrate 120 only, the second substrate 121 only, or both the first substrate 120 and the second substrate 121 in combination. Once the meniscus 182 is formed, the material is cured. The cured and solidified meniscus 182 and holds the layers of the first and second substrates 120, 121 in place with respect to each other in the Z direction.

The viscosity and surface tension of the liquid spacer 180 are known. The contact angle between the liquid spacer 180 substrate 120 (and/or 121) can be predicted, as can the ability of the liquid spacer 180 to maintain the round shape should in FIG. 3A. The time during which the liquid spacer 180 maintains its round shape should be sufficient to allow the substrates 120, 121 to be brought together. At the same time, the viscosity and surface tension of the liquid spacer 180 material is chosen so that capillary action allows the material to wet and to adhere to both surfaces, thereby forming the meniscus 182. By adjusting the volume and height (e.g., 1-2 mm height) of the deposited liquid spacer 180 material dispensed, the thickness of the resulting solidified liquid spacer element can be adjusted to the desired values.

Depending on the final distance required between substrates 120, 121, liquid spacer 180 traces can be optionally or additionally applied to the surface of the second substrate 121. In such cases, when the two substrates 120, 121 are aligned and brought together, the liquid spacer 180 material on each substrate merges and flows together to form the meniscus shape 182 shown in FIG. 3B.

This liquid spacer process can also be used to add support structures to conventional stacks to improve stability during further processing such as dicing.

The liquid spacer described herein advantageously reduces the need to maintain and store a stock of different spacer materials of varying dimensions, as any spacer width and height can be directly fabricated by controlling the dispensed volume of liquid spacer 180 material. The wafer to wafer distance (e.g., the distance d1 between the first and second substrates 120, 121) can be modulated as well. This spacing method is a more cost efficient way of holding alignment in place during stack formation. The high viscosity of the liquid spacer 180 material allows incorporation of part of the hardened replication features 140 present prior to bonding into the spacer, as well as adaptive tuning of the spacer height in a height controlled mask aligner/bonder.

The replication manufacturing features as described herein advantageously enable the creation of densely packed layouts with, and modules or stacks where optical structures and mechanical (e.g., spacers) or electrical functionality (e.g., bond pads) are combined. The features can be used to generate more dense layouts, create packages including eye safety features, reduce the number of process steps by venting channel generation, and increase precision.

A number of embodiments of the invention have been described. Nevertheless, it will be understood that various modifications may be made without departing from the spirit and scope of the invention. Accordingly, other embodiments are within the scope of the following claims.

The invention claimed is:

1. A method of manufacturing a plurality of optical elements, the method comprising:
   providing a first wafer having hardened replication material forming optical elements on a first side of the first wafer;
   providing a second wafer having hardened replication material forming optical elements on a first side of the second wafer;
   depositing liquid droplets on the first side of the first wafer between the optical elements while modulating the volume of each liquid droplet such that the deposited liquid droplets have a height of up to 2 mm;
   aligning the first side of the first wafer with the first side of the second wafer; and bringing the two wafers together such that the liquid droplets on the first side of the first wafer adhere to the first side of the second wafer forming a concave meniscus.

2. The method of claim 1, wherein the liquid droplets are formed of a high viscosity material that can be hardened.

3. The method of claim 2, comprising hardening the liquid droplets.

4. The method of claim 3, wherein hardening the liquid droplets comprises curing the liquid droplets with UV radiation.

5. The method of claim 1, further comprising depositing liquid droplets on the first side of the second wafer between the optical elements.

6. The method of claim 5, wherein the liquid droplets are formed of a high viscosity material that can be hardened.

7. The method of claim 6, comprising hardening the liquid droplets.

8. The method of claim 7, wherein hardening the liquid droplets comprises curing the liquid droplets with UV radiation.

9. The method of claim 1, wherein the volume of each liquid droplet is modulated such that the deposited liquid droplets have a height of 1 to 2 mm.

10. An apparatus comprising:
a first wafer having hardened replication material forming optical elements on a first side of the first wafer;
a second wafer having hardened replication material forming optical elements on a first side of the second wafer; and
spacers joining the first wafer and the second wafer, wherein the spacers are shaped as a concave meniscus;
wherein the spacers are formed by a process including:
depositing liquid droplets on the first side of the first wafer between the optical elements while modulating the volume of each liquid droplet such that the deposited liquid droplets have a height of up to 2 mm;
aligning the first side of the first wafer with the first side of the second wafer; and
bringing the two wafers together such that the liquid droplets on the first side of the first wafer adhere to the first side of the second wafer forming a concave meniscus.

11. The apparatus of claim 10, wherein the liquid droplets are formed of a high viscosity material that can be hardened.

12. The apparatus of claim 11, wherein the liquid droplets are by curing the liquid droplets with UV radiation.

13. The apparatus of claim 10, further comprising depositing liquid droplets on the first side of the second wafer between the optical elements.

14. The apparatus of claim 13, wherein the liquid droplets are formed of a high viscosity material that can be hardened.

15. The apparatus of claim 14, wherein the liquid droplets are hardened by curing the liquid droplets with UV radiation.

16. The apparatus of claim 10, wherein depositing the liquid droplets comprises modulating a volume of each liquid droplet to generate a desired separation distance between the first wafer and the second wafer.

17. The apparatus of claim 10, wherein the volume of each liquid droplet is modulated such that the deposited liquid droplets have a height of 1 to 2 mm.

* * * * *